April 6, 1937. R. REINHART 2,076,277
APPARATUS FOR REFRIGERATING
Original Filed Nov. 25, 1932 2 Sheets-Sheet 1
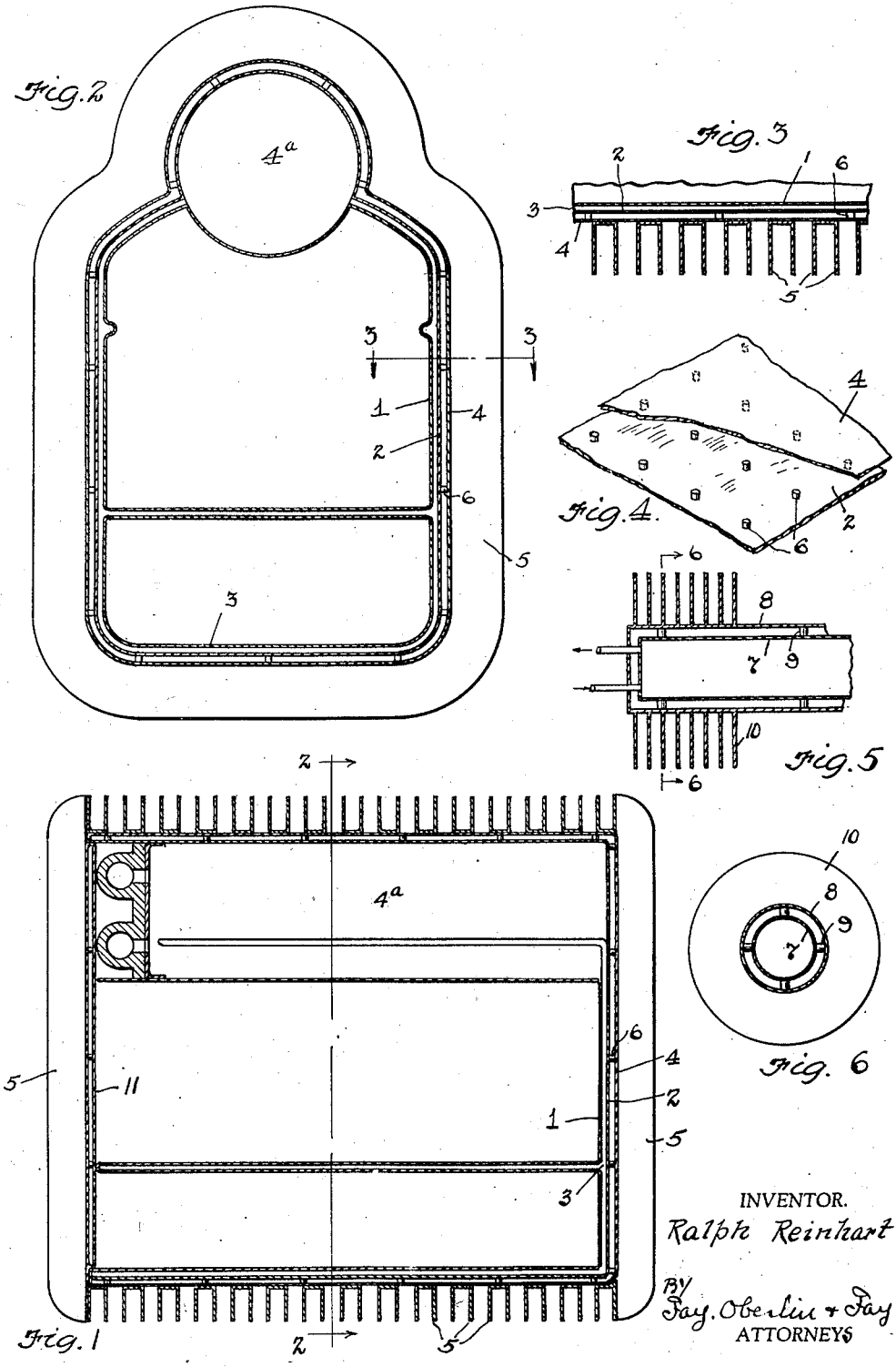
INVENTOR.
Ralph Reinhart
BY Fay, Oberlin + Fay
ATTORNEYS April 6, 1937.   R. REINHART   2,076,277
APPARATUS FOR REFRIGERATING
Original Filed Nov. 25, 1932   2 Sheets-Sheet 2

INVENTOR.
Ralph Reinhart
BY
Fay, Oberlin & Fay
ATTORNEYS.

Patented Apr. 6, 1937

2,076,277

UNITED STATES PATENT OFFICE 2,076,277

APPARATUS FOR REFRIGERATING

Ralph Reinhart, Peninsula, Ohio

Application November 25, 1932, Serial No. 644,145
Renewed July 25, 1935

4 Claims. (Cl. 62—126)

This invention relates as indicated to a method of and apparatus for refrigerating and has particular reference to such method and apparatus whereby closed spaces such as the food preserving compartments in mechanical refrigerators are maintained at the proper temperature.

As is well known, one principal difficulty in connection with the operation of mechanical refrigerators is that moisture from the air within the space being refrigerated coming in contact with the surface of the evaporator condenses in the form of frost. This condensation of moisture and frost formation is objectionable from two standpoints:—First, water that is extracted from the air in the form of frost is actually extracted from the food stored within the compartment so that most, if not all, mechanical refrigerators have a decided dehydrating effect upon the food stored therein. This has brought about the use of inconvenient and unsatisfactory closed vessels commonly referred to as hydrators in which food is placed before being stored in the refrigerator. The second chief objection to the formation of frost on an outer surface of the evaporator within mechanical refrigerators is that such layer of frost serves as a very effective insulating layer retarding the rate of heat transfer from the air to the refrigerant which must carry off the heat from within the refrigerator.

It is among the objects of my invention to provide a method of and apparatus for refrigerating in which no frost is formed so that the refrigerating unit will not have a dehydrating effect upon the air and food stored within the compartment and further, the elimination of the frost materially increases the operating efficiency of the apparatus.

To the accomplishment of the foregoing and related ends, said invention, then consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

Figure 7:
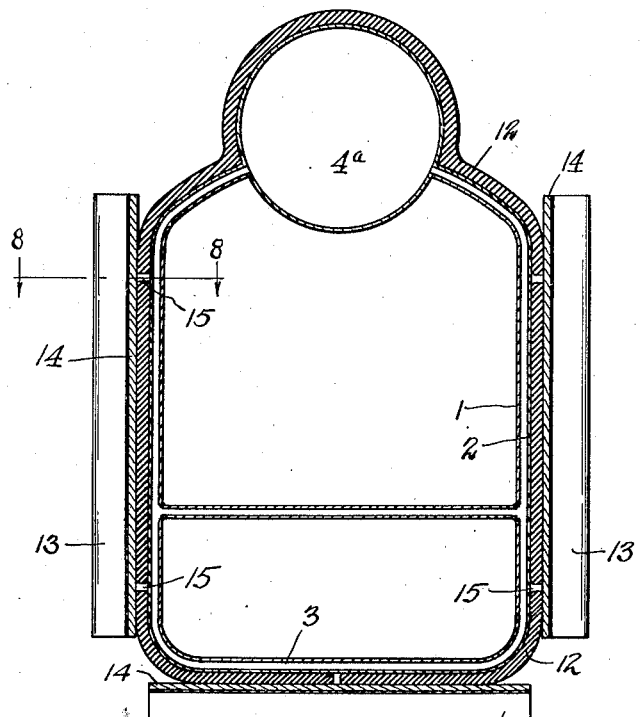
Figure 8:
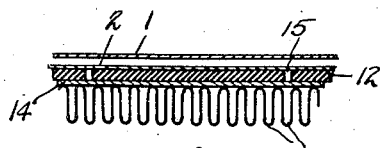
Figure 9:
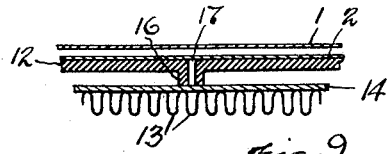
Figure 10:
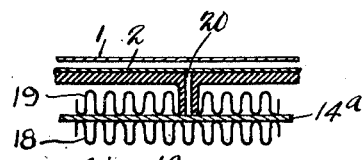

In said annexed drawings:

Fig. 1 is a longitudinal sectional view through an apparatus showing the embodiment of one form of my invention; Fig. 2 is a transverse sectional view of the apparatus as illustrated in Fig. 1 taken on a plane substantially indicated by the line 2—2; Fig. 3 is a fragmentary sectional view of a portion of the apparatus illustrated in Fig. 2 taken on a plane substantially indicated by the line 3—3; Fig. 4 is a fragmentary perspective view of a portion of the apparatus illustrated in the previous figures; Fig. 5 is a fragmentary longitudinal sectional view of another form of apparatus embodying my invention; Fig. 6 is a transverse sectional view of the apparatus illustrated in Fig. 5 taken on a plane substantially indicated by the line 6—6; Fig. 7 is a transverse sectional view of a modified form of apparatus adapted to carry out the principles of my invention; Fig. 8 is a fragmentary transverse sectional view of a portion of the apparatus illustrated in Fig. 7 taken on a plane substantially indicated by the line 8—8; and Figs. 9 and 10 are views similar to Fig. 8 showing modifications in the construction therein illustrated.

Referring now more specifically to the drawings and more especially to Fig. 1, the apparatus here illustrated for purposes of convenience in describing the principles comprising my invention is what is commonly referred to as a cooling chamber evaporator or a cooling coil, i. e., a device which produces lower temperatures by the boiling, evaporation or expansion of a refrigerant or by the introduction of super-cooled liquid, or by any method which by absorbing heat produces lower temperatures.

The evaporator illustrated for purposes of convenience in the drawings comprises an inner shell, generally indicated at 1, and an outer shell, generally indicated at 2. These shells form therebetween a closed space generally indicated at 3, into which the liquid refrigerant is charged and in which evaporation of the same is permitted to take place. In the space generally indicated at 4a will be positioned the usual expansion valve or control mechanism common to this type of apparatus and which, forming no part of this invention, will not be explained in greater detail.

It should be noted at this point that while the particular type of evaporator illustrated is of the so-called flooded type, the principles of my invention presently to be explained are equally applicable to the so-called dry expansion type, circulating brine or any other cooling method devised to produce refrigerating temperatures.

As is well known, the cooling chamber or cooling coil which actually produces the lower temperature is usually placed directly within the confines of the refrigerator so that the air in such space may by convection circulate directly in contact with the surface of the outer shell such as 2. This, as above indicated, results in the precipitation of the moisture carried by the air and as soon as the moisture condenses upon the surface of the evaporator it is immediately converted into a solid state or frost due to the necessity of maintaining the cooling unit below freezing so as to properly cool the inside of the refrigerator, freeze ice cubes, etc. which require temperatures below freezing.

I am fully aware that evaporators of the type described have been provided with surrounding means such as brine tanks and the like which are, in each instance, however, designed to quickly transmit the heat from the air to the confines of the evaporator and are employed primarily as hold-over means in an endeavor to reduce the frequency of the periods during which the compressor for the refrigerant operates. In each instance, however, such enclosing means for the evaporator are of such character that the outer surface of such enclosure is reduced to a temperature below freezing so that the present problem is not solved by such devices.

My invention contemplates insulating the evaporator by some suitable means which is so designed and constructed as to prevent the refrigerating surface with which the air comes in contact from normally dropping to a temperature of freezing or below freezing.

By maintaining the refrigerating surface with which the air comes in contact at a temperature at least slightly higher than freezing, it may be necessary to increase the area of such surface over that which would be required were such surface permitted to drop to a temperature below freezing.

One manner in which an evaporator may be constructed functioning in the above defined manner is to enclose the outer shell 2 of the expansion chamber 3 by means of another shell generally indicated at 4, which shell is provided with a plurality of outwardly extending fins or vanes 5 which increase the effective refrigerating area of this outer shell.

Some means must be provided so that for a given operating temperature of the air within the refrigerator, as well as the temperature conditions within the evaporator, the temperature of the shell 4 and its fins 5 will always be at least slightly above freezing.

I have devised a scheme for separating the shells 2 and 4 for a somewhat greater distance than that required if a dead air space only were relied upon to insulate said shells, and to maintain such shells in proper relationship and with the proper rate of heat transfer therebetween for the requirements as above outlined.

This scheme, as illustrated in Figs. 1 to 6, consists in the provision of a plurality of spaced studs 6, preferably welded at opposite ends to the shells 2 and 4 and formed of some material having fairly good thermal conductivity. Given the operating temperature desired in the refrigerator, as well as the temperature range within the space defined by the evaporator, it is a very simple matter to calculate the conductivity of the air space between the two shells and to fill out the required conductivity by the provision of studs varying in number according to their length, cross-sectional area coefficient of thermal conductivity and the temperature gradient between the two shells. No definite set of calculations is given in this description for the reason that any set of values given to the above group of variables would be purely arbitrary and accordingly would merely amount to an example which is believed not necessary to the full understanding of my invention by those familiar with the art.

As illustrated in Figures 5 and 6 and as above indicated, the form of the particular evaporator construction to which the principles of my invention are applied may vary in form and may be a simple cylindrical inner shell 7, and an outer shell 8 maintained in spaced relation by a suitable number of conductive studs 9. The outer shell 8 will be provided with a plurality of fins or vanes 10 varying in number and surface area so as to keep the temperature gradient between the air and the outer surface of the evaporator to a minimum. The studs 6 may, however, be replaced by ridges or any form of contact of any other suitable medium either fluid, solid, gas, or gel, which for the particular construction and circumstances of operation will maintain the proper temperature gradient between the two surfaces or, as stated before, the two surfaces of the evaporator may be spaced by continuous insulating medium either fluid, solid, gas or gel.

In order that the convection currents of air within the refrigerator may not circulate through the evaporator as illustrated in Figures 1 and 2, which would permit condensation to occur on the inner surface of the shell 1, both ends of the evaporator will be closed by a suitable double-walled arrangement such as is employed to laterally confine the space in which below-freezing temperatures are maintained. The front of such space may be closed by a simple door generally indicated at 11, which preferably will have no refrigerant expansion space associated therewith but which will consist simply of an insulated surface so insulated that the temperature within this chamber will not reduce the temperature of the outer surface of the door and its associated fins to freezing or below freezing.

A further scheme for accomplishing the above-named ends is illustrated in Figs. 7 to 10 in which the evaporator is substantially identical with that illustrated in Figs. 1 and 2 so that like reference characters will be employed to designate like parts. As illustrated in Fig. 7, however, instead of employing an outer closure shell 4 spaced from the outer shell of the evaporator, I provide a layer of insulating material generally indicated at 12 which may be applied to the evaporator by molding, dipping or the like. This insulating material may be of any suitable substance adaptable for this purpose and which may be readily applied and caused to adhere to the outer surface of the evaporator.

Instead of having the fins 5 extend continuously around the evaporator as illustrated in Fig. 2, they may be carried only partially around the evaporator as illustrated in Fig. 7 and such fins may be of a slightly different form than that illustrated in the previous figures.

As illustrated in Fig. 8, the fins 13 may be formed of a corrugated sheet spot-welded or similarly secured to a sheet or plate 14 which is thermally linked to the outer shell 2 of the evaporator by some means such as studs 15 which will vary in number, length, cross-sectional area and thermal conductivity according to the particular requirements as herein more fully explained.

Instead of having the plate 14 abut directly against the outer surface of the insulating layer 12, such plate 14 may be spaced therefrom as is illustrated in Fig. 9 and maintained in such spaced relation by bosses 16 around the conducting studs 17. When the plate 14a is spaced from the outer surface of the insulating layer 12, two sets of fins 18 and 19 may be secured to opposite faces of such plate. In such construction slightly longer studs 20 may be necessary to conduct the heat from the plate 14a than those required with constructions such as are illustrated in Figs. 8 and 9. By spacing the plate 14a from the surface of the insulating layer 12, as illustrated in Fig. 10, the surface area of the outer element with which the medium to be refrigerated directly contacts may be readily increased by a large amount.

The employment of the apparatus comprising my invention has a further advantage which has not as yet been mentioned. The enclosure of the evaporator by a thermal insulating blanket or the like prevents the higher temperatures surrounding the cooling chamber from transferring heat to the ice cube trays thus speeding the freezing of the water in such trays.

When the method and apparatus comprising my invention are employed, the refrigerating surface of the unit will, as above indicated, be maintained at all times at least slightly above the freezing point of water. This obviates the possibility of the occurrence of a layer of frost over the unit and actual tests conducted on apparatus constructed in accordance with my invention show that this elimination of the frost layer materially increases the efficiency of the refrigerating system as evidenced by a material reduction in the time during which the compressor is forced to operate in order to maintain the desired temperature within the refrigerator.

The entire elimination of the occurrence of frost also prevents, at least almost entirely, the dehydration of the air and tests on apparatus constructed in accordance with my invention show that if frosting is permitted to occur, the humidity drops to approximately 50; whereas, if frosting is prevented, the humidity may be maintained between 80 and 90.

It is believed that the principles comprising my invention are clearly understandable to those familiar with the art without a further description and without a more detailed description of the specific construction which has been chosen for the purpose of illustrating one embodiment of my invention.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:

1. In a refrigerating apparatus, the combination of a refrigerant container the outer surface of which normally has a temperature below the freezing temperature of water, a blanket of a heat insulating medium around said container, an outer finned heat absorbing casing, and a plurality of uniformly spaced heat drains extending through said blanket of insulating medium and thermally coupling said container and said casing so as to normally maintain the temperature of said casing at all points above the freezing temperature of water.

2. In a refrigerating apparatus, the combination of a refrigerant container, the outer surface of which is normally below the freezing temperature of water, an outer heat absorbing member spaced from said container, a blanket of insulating medium between said container and said heat absorbing member, and heat drains extending through said blanket and so thermally coupling said container and heat absorbing member that the outer surface temperature of the latter is normally above the freezing temperature of water.

3. In a refrigerating apparatus, the combination of a freezing unit, including a heat conductive shell and means to withdraw heat from the interior thereof at a rate which maintains therein a temperature substantially below that at which water freezes; an outer heat absorbing member spaced from said unit; a blanket of insulating medium surrounding said unit and located between said unit and said member; and means thermally coupling said unit and said member, which means transfer heat from said member to said unit at a rate which maintains the member at a temperature slightly above that at which water will freeze.

4. In a refrigerating apparatus, the combination of a freezing unit, including a heat conductive shell and means to withdraw heat from the interior thereof at a rate which maintains therein a temperature substantially below that at which water freezes; an outer heat absorbing member spaced from said unit; a blanket of insulating medium surrounding said unit and located between said unit and said member; and heat drains thermally coupling said unit and said member through said blanket, which drains are so proportioned that they will transfer heat, at a rate which will maintain in the member a temperature slightly above that at which water freezes, when the desired temperature is maintained in the unit.

RALPH REINHART.